United States Patent [19]

Albright et al.

[11] 4,110,481

[45] Aug. 29, 1978

[54] METHOD OF COOKING FOOD IN HOT NON-AQUEOUS LIQUIDS UNDER AIR PRESSURE

[76] Inventors: Charles Jere Albright, 919 No. Michigan Ave., Chicago, Ill. 60611; Clifford E. Fitch, Sr.; Clifford E. Fitch, Jr., both of P.O. Box 219, South Holland, Ill. 60473

[21] Appl. No.: 712,747

[22] Filed: Aug. 9, 1976

Related U.S. Application Data

[63] Continuation of Ser. No. 412,624, Nov. 5, 1973, abandoned, which is a continuation-in-part of Ser. No. 881,230, Dec. 1, 1969, Pat. No. 3,793,940.

[51] Int. Cl.² .............................................. A23L 1/00
[52] U.S. Cl. .................................. 426/438; 426/523; 99/408

[58] Field of Search ................. 99/367, 368, 403–408; 426/438, 523

[56] References Cited

U.S. PATENT DOCUMENTS

| | | | |
|---|---|---|---|
| 3,259,521 | 7/1966 | Crall | 99/408 |
| 3,280,722 | 10/1966 | Rahauser | 99/408 |
| 3,336,859 | 8/1967 | Barker | 99/367 |
| 3,463,078 | 8/1969 | Pirtle | 99/403 |

Primary Examiner—Norman Yudkoff

[57] ABSTRACT

The essential concept of this invention basically involves the improved structuring and operative arrangement of a multiple-receptacle apparatus for the pressurized cooking of food in hot, non-aqueous liquid, wherein the food is inserted into and removed from a receptacle cooking compartment when it is essentially drained of hot liquid and free of pressure, and the method of carrying out the aforesaid.

26 Claims, 37 Drawing Figures

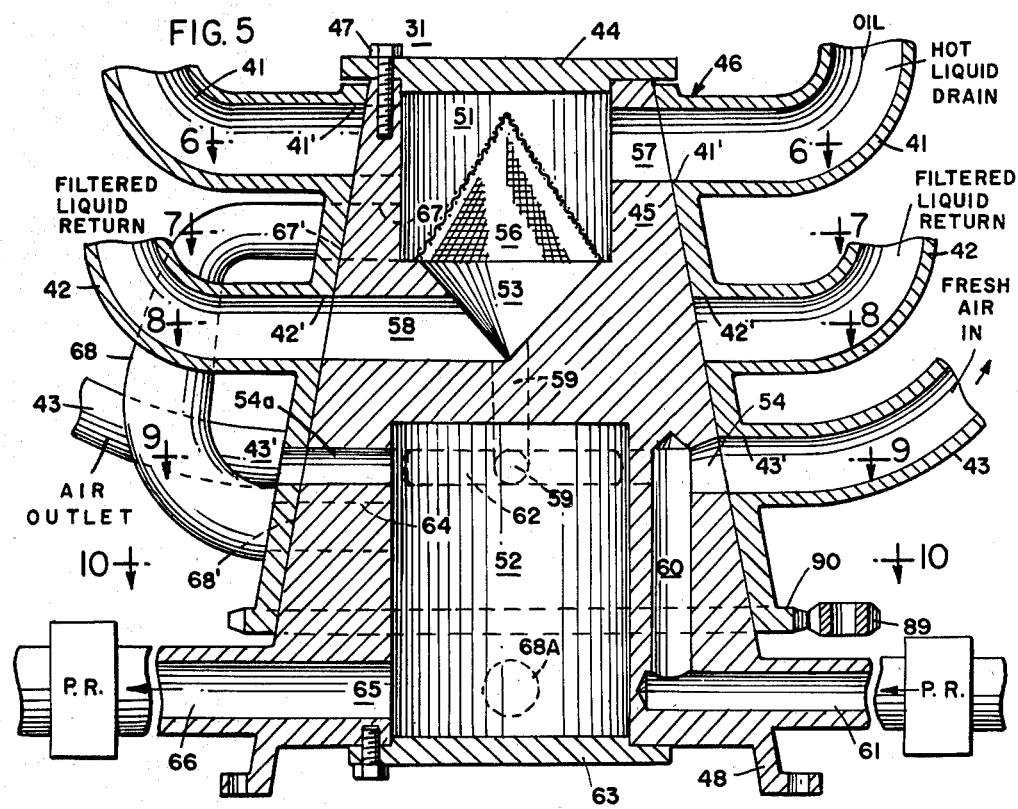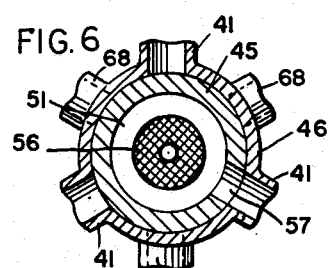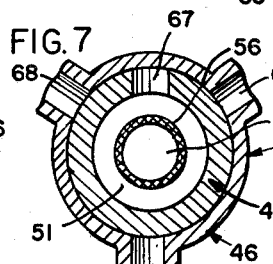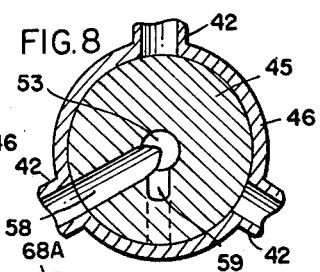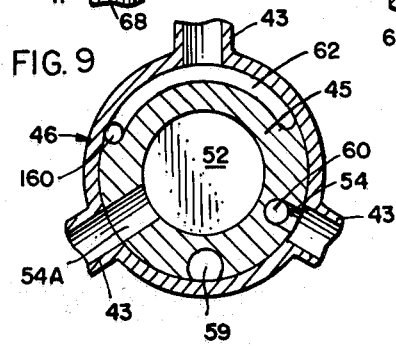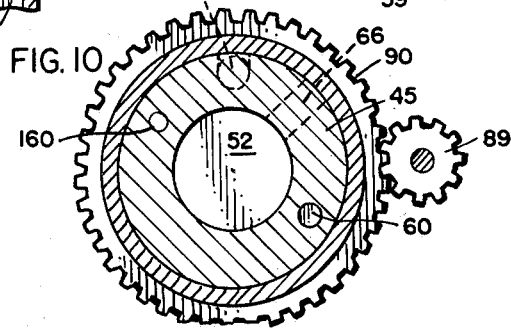

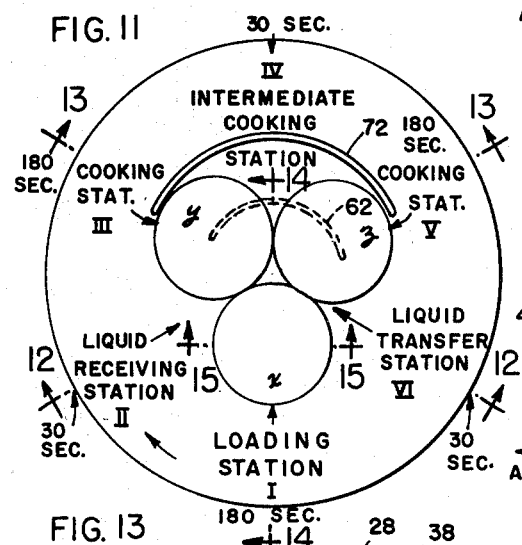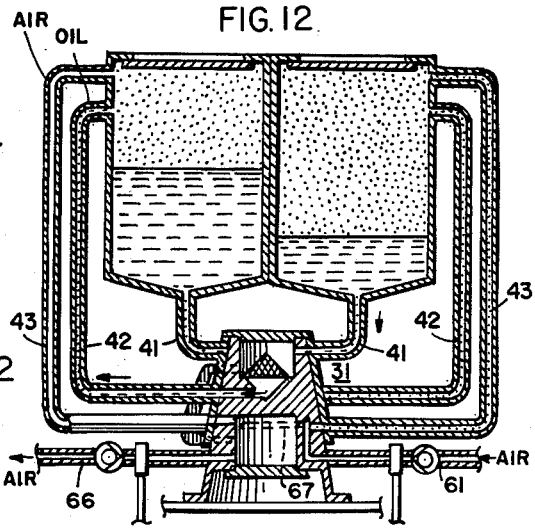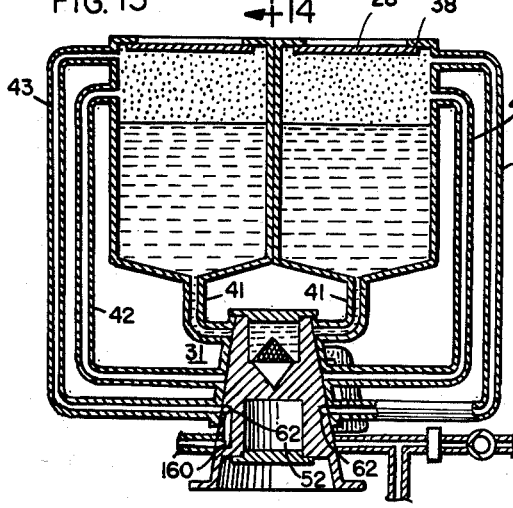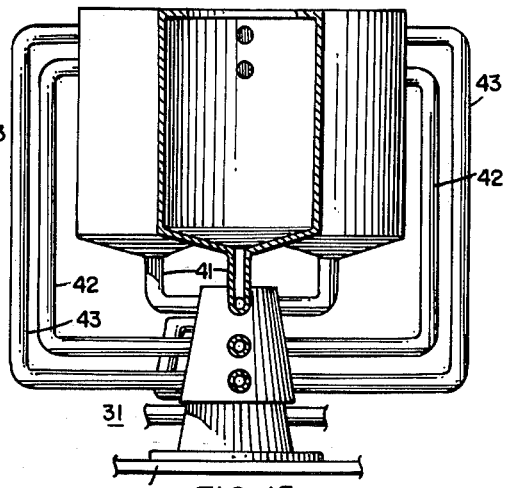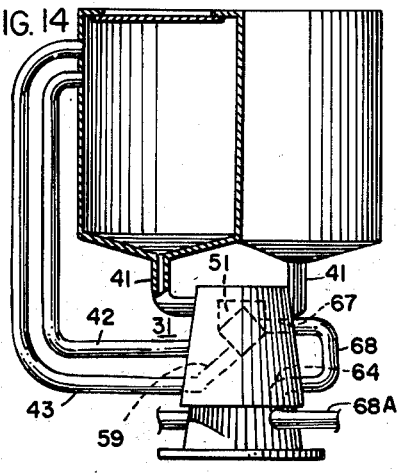

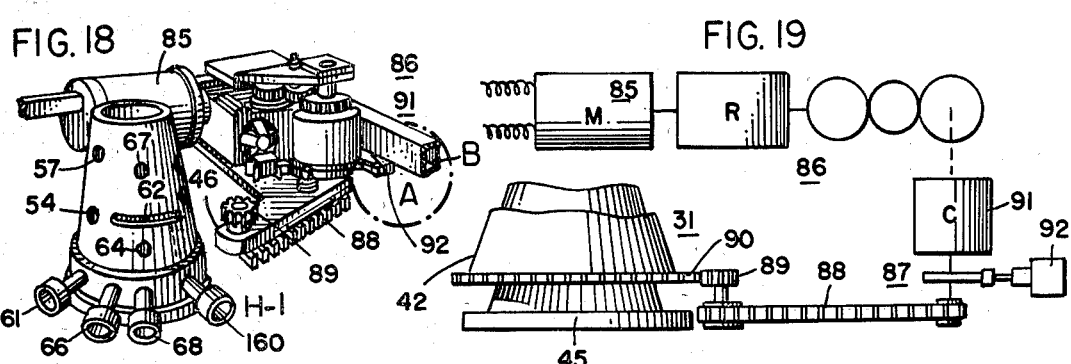
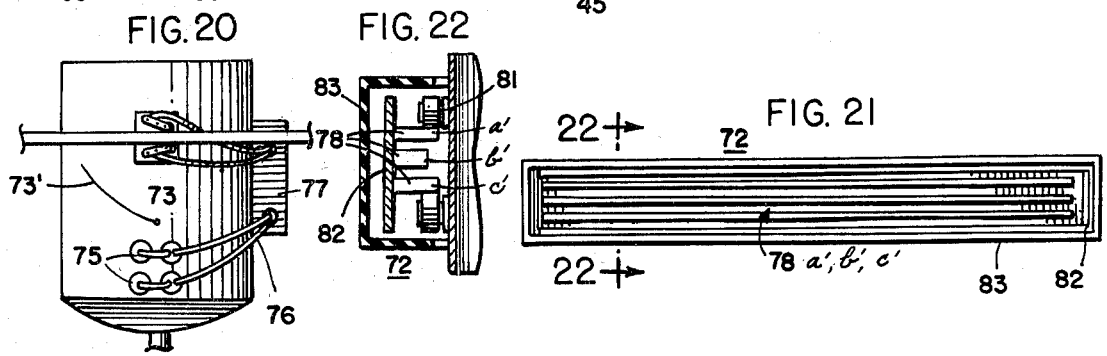
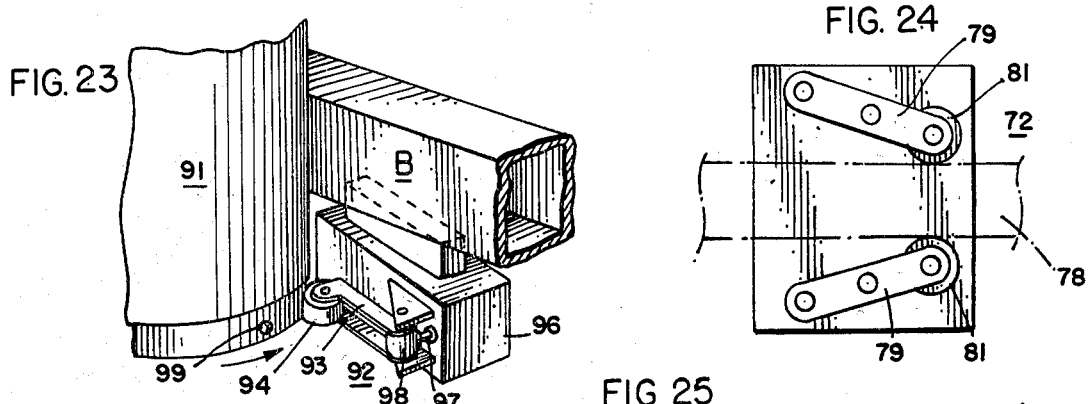
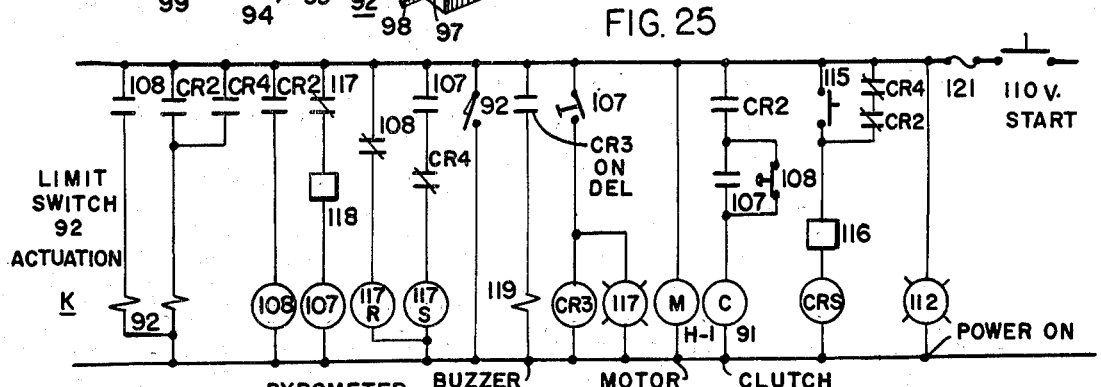
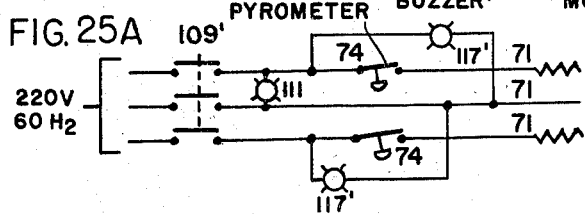

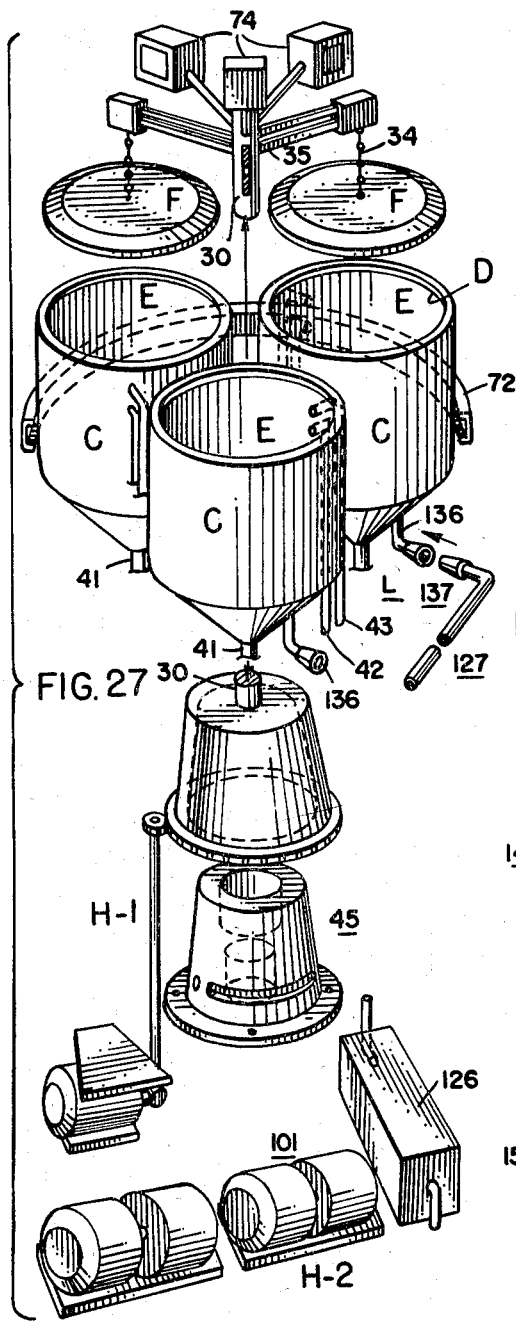
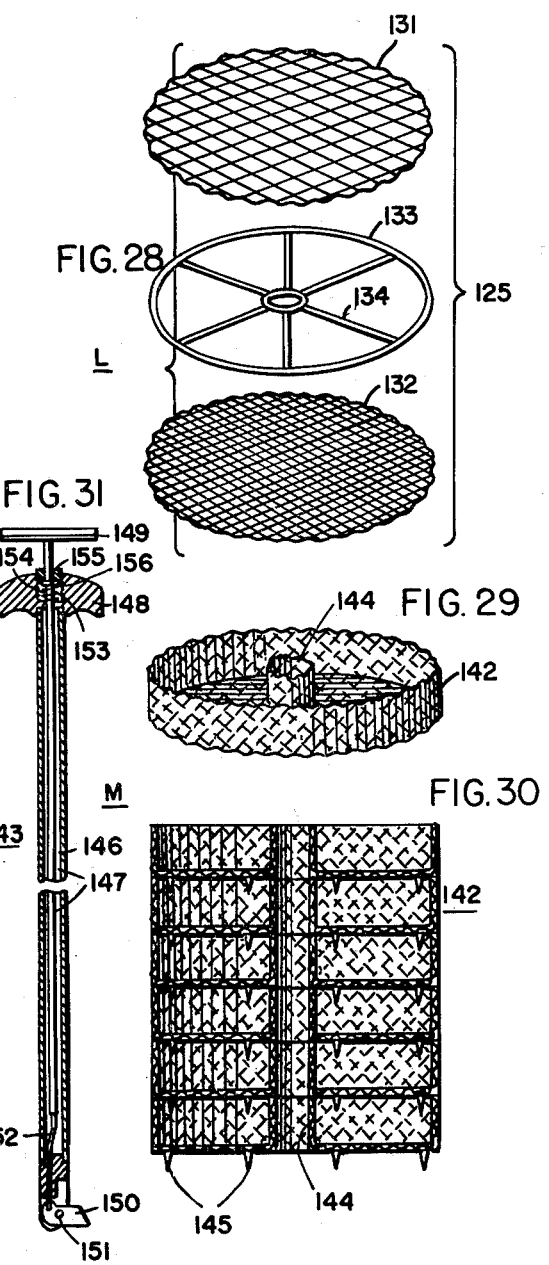

METHOD OF COOKING FOOD IN HOT NON-AQUEOUS LIQUIDS UNDER AIR PRESSURE

This is a continuation, of application Ser. No. 412,624, filed Nov. 5, 1973, now abandoned, which was a continuation-in-part of our application Ser. No. 881,230, filed Dec. 1, 1969, now Pat. No. 3,793,940.

This invention relates to a new and effective structuring of equipment and method for use in the cooking of food in hot, non-aqueous liquids under pressure.

It is a well known fact that the frying and/or baking of food--especially meat--requires a considerable period of time. During that time the natural juices, inherent in the food, are subjected to the high temperatures required for cooking the food. This converts the food-juices into steam which escapes into the ambient atmosphere. Such extraction of the juices lsesens the taste appeal and the nutrient quality of the food.

Such types of apparatus are used with the cooking chamber operating at pressures ranging from 14 to 35 psi, for cooking periods ranging from 6 to 12 minutes. The general optimum for these conditions are 35 psi at temperatures approximately 380°. The time periods have to be determined by the size and nature of the food product being processed, and the desired resulting cooked condition of the foods.

In prior art methods and apparatus at the close of each cooking cycle, the cooking chamber has to have the pressure reduced to nearly normal ambient atmospheric conditions. This is imperative before opening the chamber for the removal of the food. Any attempt to obtain access to the chamber, before such reduction to pressure, very possibly could result in serious harm to the operator and/or the spraying of particles of hot liquid over adjacent areas. Hence, a minute or more has to elapse before the cooked food can be removed from the hot liquid. As a consequence a considerable portion of the natural juices in the food are converted into steam, during this brief period, rising into the space above the hot liquid. Obviously, this adds, somewhat, to the pressure in the receptacle and tends to further delay the removal of the closure-lid, and the withdrawal of the food from the hot liquid. Thus, in these prior disclosures there, inevitably, occurs the condition which has been noted above with regard to the process of frying or baking foods; namely, the loss of a portion of the natural food-juices.

Another disadvantage of such methods and apparatus is that under continuous use over periods of time the draining and filtering of the liquid has to be effected when the apparatus is not required for cooking. As a result particles released from the earlier cooked food tend to accumulate in the liquid during such extended cooking periods. These accumulations tend to lessen the cooking efficacy of the liquid over an extended period of time. Moreover, the overcooked particles from previously-processed food tend to cling to the later-cooked food. The result is a reduced appeal to the later cooked food.

It should also be noted here that the prior art structures were developed to meet a then-current demand for mass-production of food products cooked in pressurized hot liquid. Currently, that demand has increased so greatly that these antecedent, single-receptacle apparatus are insufficient to meet this increased demand.

The main objects of this invention are; to provide a radically new method and structuring of a multiple-unit apparatus for the cooking of food in hot, non-aqueous liquids under pressure; to provide improved means for effecting the practically instant draining of the hot liquid and pressure from a receptacle at the end of a predetermined cooking period to permit the momentary withdrawal of the cooked food and the insertion of uncooked food, with the subsequent return of the hot liquid and pressure to the loaded receptacle; to provide for the introduction of hot liquid and pressure into a receptacle and subsequently effecting a practically instant withdrawal thereof; to provide improved means of this kind for transferring the hot-liquid and pressure from one receptacle to another; to provide an improved arrangement of a plurality of individual cooking receptacles in juxtaposed arrangement operable to effect the pretimed cooking of food successively in the respective receptacles; to provide improved means for the filtering of the hot liquid; to provide improved means for the filtering of the hot-liquid incident to each transfer thereof from one receptacle to another; to provide means for the automatic flushing of the filter following each passage of hot liquid therethrough to provide a multiple, food-cooking apparatus of this kind wherein two or more receptacles may be arranged on a common support; to provide an improved means for maintaining a desired temperature of the liquid and pressure of air in each food-loaded receptacle throughout a continuous and uninterrupted operation of the apparatus; to provide an improved arrangement of manually-activatable instruments for automatically effecting the predetermined cooking period in each receptacle; to provide an improved concentric arrangement of three receptacles with a pair of relatively-shiftable, coordinated valve elements the functioning of which is predetermined by the manual setting of certain of the instruments; to provide an apparatus of this kind wherein three receptacles are concentrically fixed about a central axis of rotation; and to provide an improved food-cooking apparatus of this kind of such simple structure as to make highly economical the manufacturing and marketing thereof and exceedingly gratifying and profitable the use thereof by purchasers.

The attainment of these objects can be effected by any type of structural arrangement, comparable to what is illustrated and explained herein. Such an arrangement involves a plurality of receptacles the sequential functioning of which is controlled by a valve-complex and an associated-timer-controlled mechanism. The adaptation herein shown involves a valve-complex of frustum form. Whatever its form the valve-complex is activated by effect successive food-cooking periods in the respective receptacles with the recurring transfer of the hot liquid and/or pressure from one receptacle to another at the termination of each cooking period. The arrangements herein show multiple receptacles disposed in different vertical and horizontal relationships.

In the adaptations shown in the accompanying drawings:

FIG. 5 is a much-enlarged, vertical, diagrammatic, cross-sectional view of the frustum-type valve-unit as viewed from the plane of the line 5—5 of FIG. 3;

Figure 16:
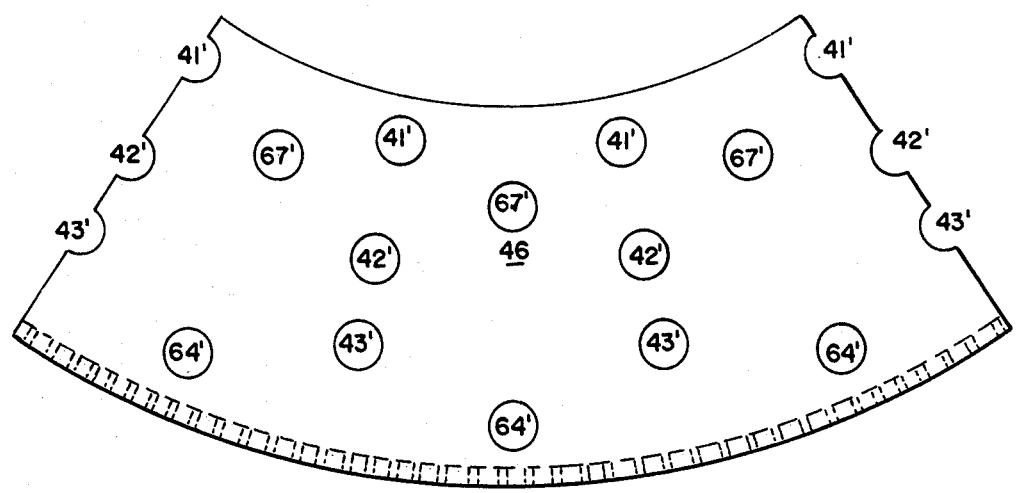
Figure 17:
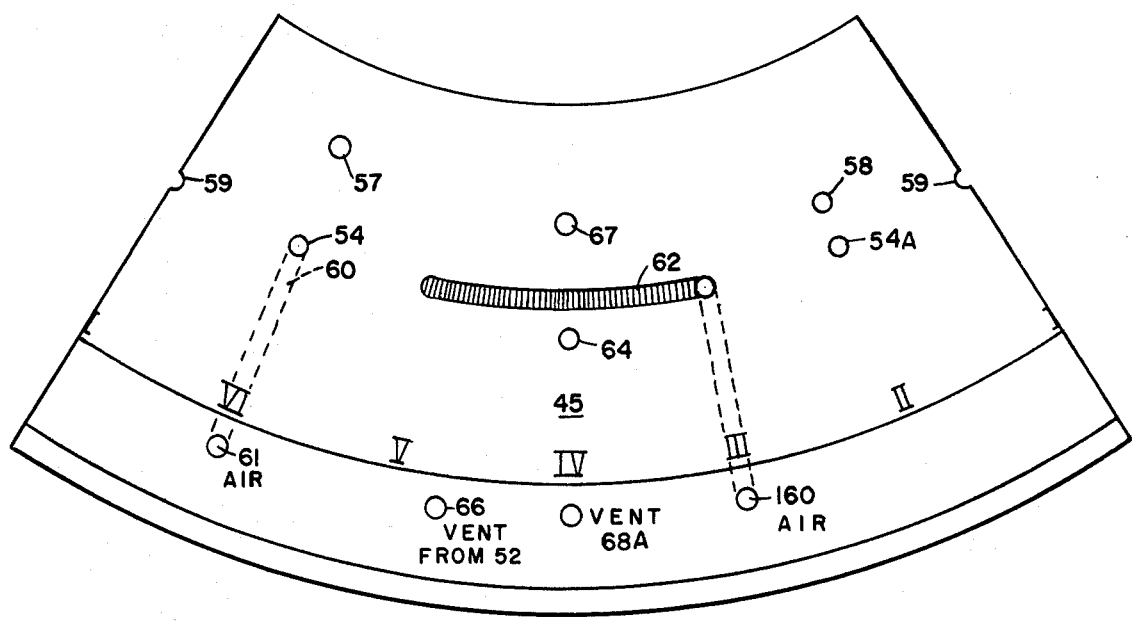
Figure 32:
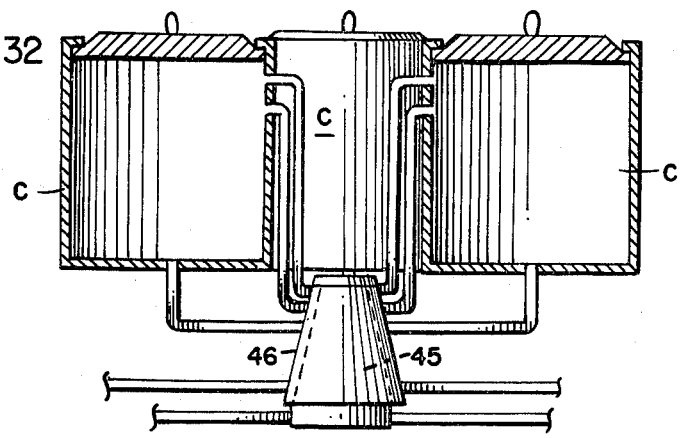
Figure 33:
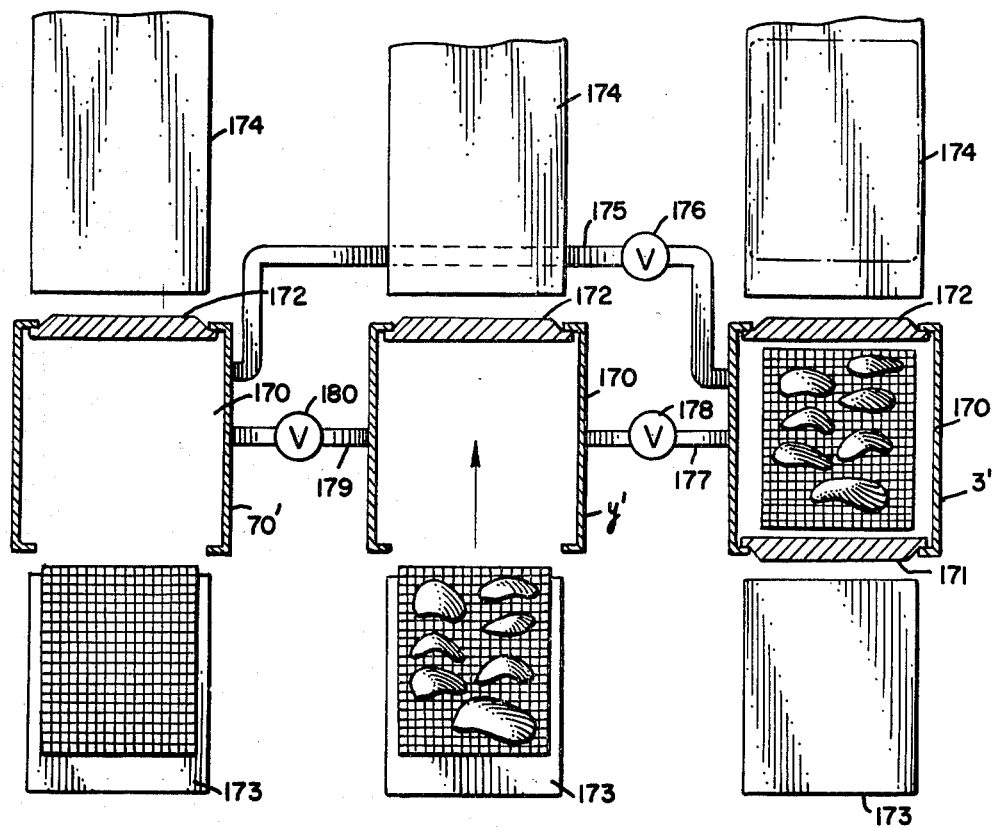
Figure 34:
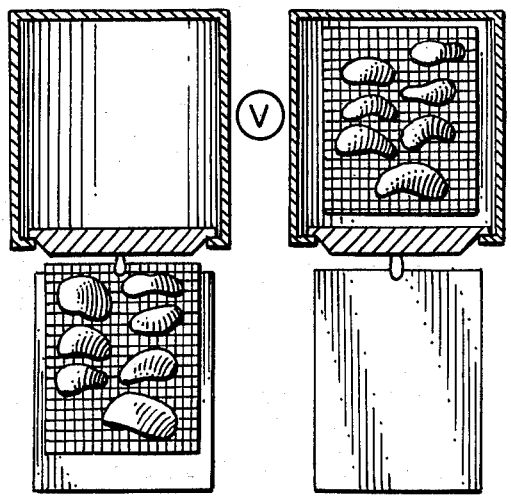
Figure 35:
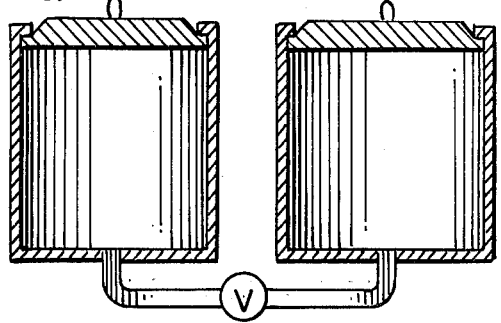

FIGS. 6 through 10 are reduced-size, cross-sectional views taken on the plane of the respective lines 6—6 through 10—10 of FIG. 5, designed to show the ports that are open for fluid flow in the respective planes;

FIG. 11 is a diagrammatic chart showing the six stations through which the receptacles successively move, with halts at each station during the successive cooking of batches of food in each of the three receptacles;

FIG. 12 is a miniature and somewhat diagrammatic, vertical cross-sectional view of a pair of the receptacles at the stations II and VI of FIG. 11, as viewed from the plane of the line 12—12 of that FIG. when the hot liquid is being transferred from any one to another of these receptacles;

FIG. 13 is another miniature and somewhat diagrammatic, vertical, cross-sectional view of a pair of the receptacles at the stations III and V respectively, during a food-cooking period; as viewed from the plane of the line 13—13 of FIG. 11;

FIG. 14 is another miniature and somewhat diagrammatic, vertical, cross-sectional view of one of the receptacles taken on the plane of the line 14—14 of FIG. 11 showing the empty condition just before the closure-lid is withdrawn;

FIG. 15 is a similar miniature-size and somewhat diagrammatic, vertical view of the three receptacles—with the forward one in cross-section when at the food-loading and -unloading station, the view being on the plane of the line 15—15 of FIG. 11;

FIG. 16 is a peripheral layout of the inner face of the outer member of the valve-complex;

FIG. 17 is a peripheral layout of the outer face of the inner member of the valve-complex;

FIG. 18 is a miniature diagrammatic perspective of the motor-clutch-drive (juxtaposed to the inner part of the valve-complex) which effects the controlled, recurring rotative movements and halts of the receptacle relative to the six stations shown in FIG. 11;

FIG. 19 is a diagrammatic, side elevation of the various units of the motor-clutch drive shown in FIG. 18;

FIG. 20 is a much-reduced exterior view of one of the receptacles indicating the electrical connections for heating the cooking liquid therein;

FIG. 21 is an inside face view of the housing-mounted, three-track, two-trolley heat-control feature for effecting the successive cooking periods in the receptacles;

FIG. 22 is an enlarged, cross-sectional view, taken on the plane of the line 22—22 of FIG. 21, showing the opposed trolleys of FIG. 21;

FIG. 23 is an enlarged, partly broken-away, view of the device, shown in the circle A of FIG. 18, which controls the recurring 60 degree rotation of the receptacles during the normal continous use of the apparatus;

FIG. 24 is an enlarged side view of a pair of trolleys shown in FIGS. 20 and 22;

FIGS. 25 and 25a constitute a schematic layout of the circuitry and the various instruments involved in the operation of the preferred adaptation of such an apparatus, incident to the successive cooking of food in the respective receptacles;

FIG. 26 is a perspective view of one of a pair of electric heating elements used in each receptacle;

FIG. 27 is another exploded, diagrammatic, perspective of the primary features of this apparatus;

FIG. 28 is an exploded, perspective of the parts of an auxiliary filter used in the receptacles;

FIG. 29 is a perspective view of one of the containers used for the cooking of food in this apparatus;

FIG. 30 is a vertical, cross-sectional view of a stack of these food-containers as they generally are used with this apparatus;

FIG. 31 is a view of the handling tool for inserting into a stack of these containers—loaded with food—and later removed therefrom;

FIG. 32 is a diagrammatic view of a modification wherein the receptacles are stationary and the inner, frustum-shaped valve-unit (FIG. 5) is rotative relative to the receptacles;

FIG. 33 is a diagrammatic plan view of another modified structure wherein three receptacles are arranged in horizontal disposition;

FIG. 34 is a diagrammatic, cross-sectional view of a pair of valve-connected receptacles horizontally-disposed for effecting substantially the same results as are accomplished in these other developments;

FIG. 35 is a view showing two such receptacles in vertical disposition; and

Figure 36:
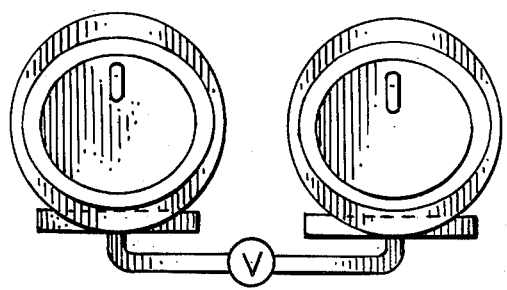

FIG. 36 is a view of the front or top, respectively, of what is shown in FIGS. 34 and 35.

Any of the multiple-receptacle apparatus, herein-shown and -described, generally will comprise a cabinet A supported on an enclosed framework B mounting a plurality of food-cooking receptacles C and having food-loading and -unloading openings D, to the respective cooking chambers E, each sealed by a closure-lid F and wherein the heating of the liquid is controlled by heat-pressure system G, in a sequence as effected by motor mechanism H-1 and H-2 under the control of a group of operational-control instruments I mounted on a panel J and incorporated in a circuitry K plus certain auxiliary units L, for use with special food-cooking accessories M, all of which will be set forth in detail in what follows.

A multiple-receptacle apparatus and method embodying the foregoing concept, comprises juxtaposed, open-end cooking receptacles arranged to permit the receptacle (i) to be successively loaded with predetermined batches of raw food, (ii) having the closure-lids positioned over the open ends of the loaded receptacle, (iii) successively subjecting the loaded receptacles to pretimed cooking periods, (iv) successively effecting the filtered transfer of the hot liquid and pressure from one receptacle to another, (v) retracting the respective closure-lid and (vi) removing the batch of cooked food and inserting fresh batch of raw food, whereupon the apparatus is subject to (vii) a continued succession of these functions.

Several types of such three-unit and two-unit apparatus are shown herein for use with either vertical- or horizontally-disposed receptacles. However, such an apparatus could incorporate four or more receptacles.

A presently-preferred structure, for such an apparatus, is shown in FIGS. 1 through 32. This adaptation involves a battery of three open-top receptacles C, hereinafter occasionally referred to as $x$, $y$ and $z$, each with its own closure-lid F. Such receptacles C are concentrically arranged in vertical disposition, with respect to a central standard 30 on a valve-complex 31 secured to a base plate 32 of the framework B. The functioning of such a group of receptacles C is determined by the coordinated action of the other features noted in these above paragraphs.

Figure 4:
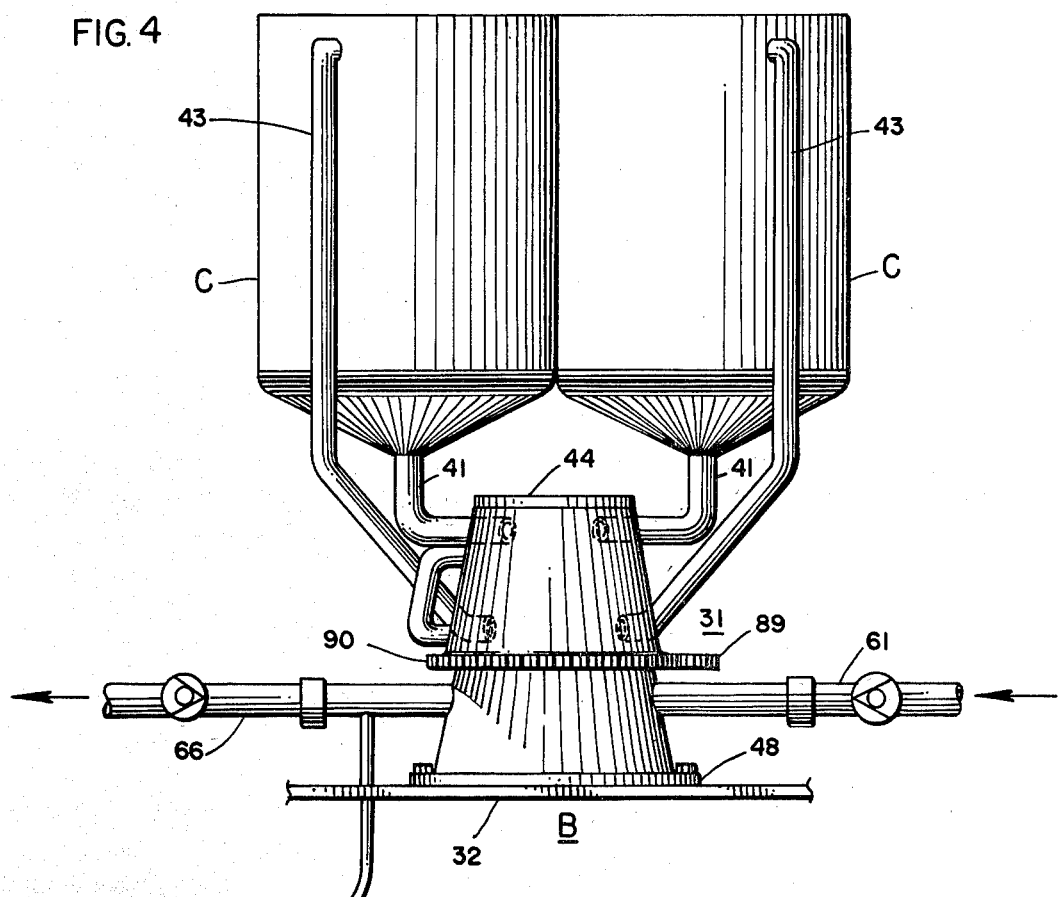
FIG. 4 is a somewhat reduced front elevational view of two of the receptacles taken on the plane of the line 4—4 of FIG. 3.

The closure-lid F, as shown for use in this multiple-unit apparatus, is one of the several possible forms shown in applicants' co-pending application Ser. No. 793,392, filed Jan. 23, 1969, now abandoned, continuation-in-part filed Sept. 29, 1971, Ser. No. 184,892, now U.S. Pat. No. 3,778,524. In that application the herein used closure-lid is shown in FIGS. 4 and 5. However, the closure-lid F could be one of those shown in FIGS. 6 through 13 of the aforesaid co-pending application, or, perchance of another different form. In fact, certain of these might be preferred for some of the multiple-unit structures hereinshown, or later developed.

A closure-lid 33 for each of the receptacles x, y and z, of the above-noted type, is shown suspended by a flexible tie 34 from an arm 35 hinged to a bracket 36 mounted on the standard 30. Springs 37 (FIG. 1) are fixed at their inner ends to the bracket 36 and looped around the respective arms 35. These serve to position each closure-lid 33 against a flange 38 (FIG. 1) of a receptacle C, pending the operative retention of the closure-lid by the later-produced cooking pressure therein. These springs 37 also bias the respective closure-lid 33 upwardly above the receptacle C when the lid is to be removed from within a particular receptacle C (FIG. 1), as will be explained later.

Figure 1:
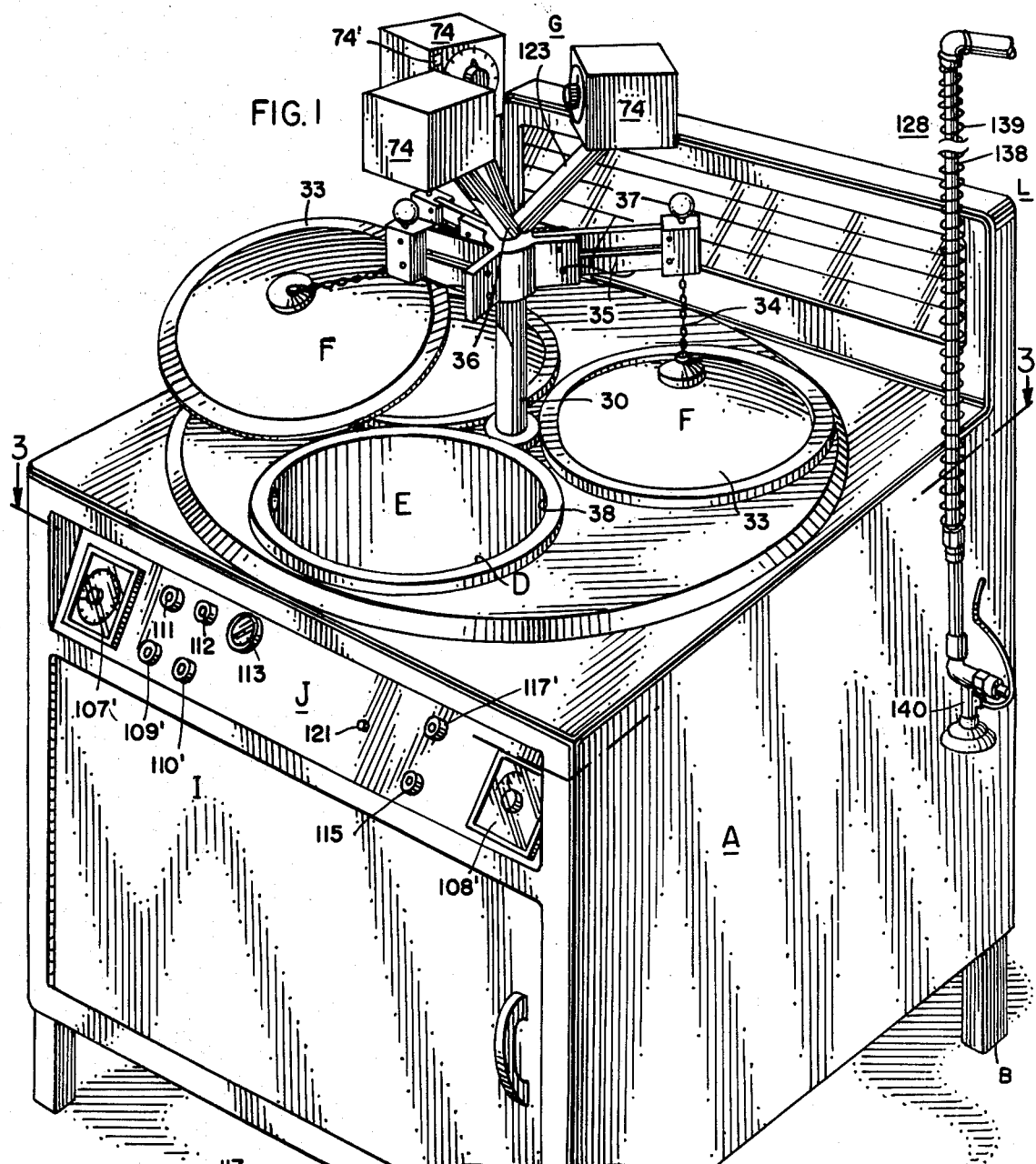
FIG. 1 is a front perspective view of a cabinet-enclosed, three-receptacle cooking apparatus embodying the hereinbefore stated concept, with the most forward closure-lid shown retracted to permit food-loading and unloading thereof.

The heat-pressure system G involves the valve-complex 31, heat-producing units 71, a track-trolley feature 72 and thermal couples 73 connected to pyrometers 74 mounted above a group of receptacles C, as shown in FIG. 1.

The valve-complex 31, for the adaptation shown in most of the FIGS. 1 through 27, is a most significant feature of this apparatus. As FIG. 3 indicates, such a valve-complex is connected to the respective receptacles C by a series of conduits in the form of tubes 41, 42 and 43 (See also FIGS. 12, 13, 14 and 15). These tubes provide for the hot liquid and air-pressure drain and supply, respectively, to and between these three receptacles x, y and z. The functioning of this valve-complex will be explained in detail in the subsequent "operation" section of this specification.

Such a frustrum-valve-complex 31, as shown in FIGS. 5 through 10, is constituted of three main parts 44, 45 and 46. However, it should be understood that this FIG. 5 is somewhat diagrammatic in that the above-noted tubes 41, 42 and 43, and the hereinafter-noted ports and channels are shown as diagrammatically opposed. In the actual structure there are three groups of these tubes, and opposed ports and channels, as is readily apparent from FIGS. 5 through 10 and FIGS. 16 and 17.

The top part 44 serves as a seal for the upper open ends of the parts 45. Such part 44 is secured in place, on the upper end of the part 45 by a number of bolts 47.

Figure 3:
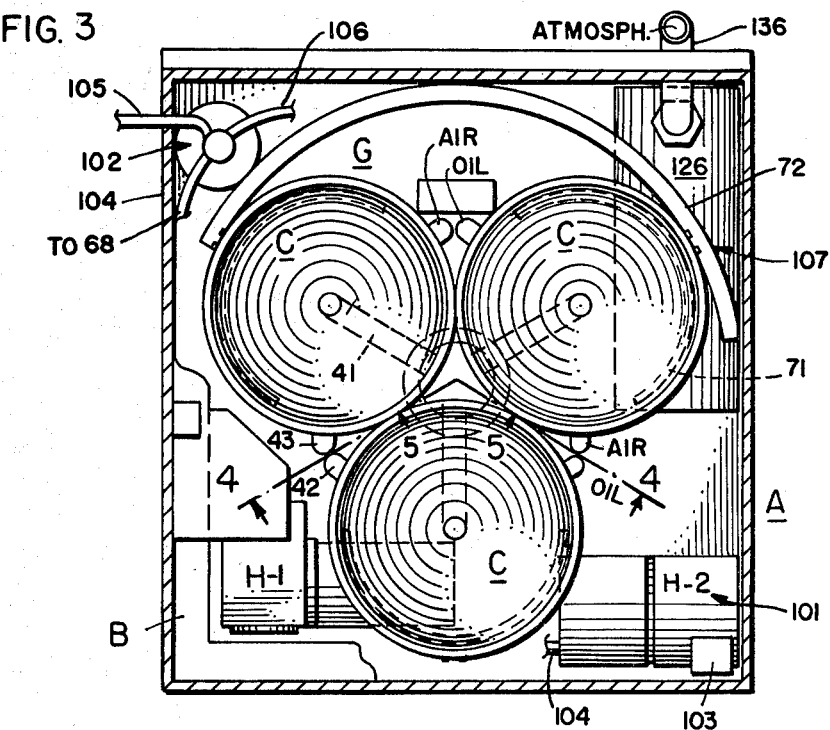
FIG. 3 is a reduced-size, plan of the receptacle arrangement as viewed approximately from the plane of the line 3—3 of FIG. 1.

The fixed inner frustum part 45 has the flanged base-rim 48 bolted to the base plate 32 of the framework B (FIG. 3). Interiorly, this part 45 has two axially-spaced compartments 51 and 52. Leading to and from these respective compartments 51 and 52 are special axially- and radially-spaced channels as presently noted. (See above-noted FIGS. 5-10)

The upper compartment 51, closed by the plate 44, preferably is of cylindrical form with an inverted, downwardly-disposed conical extension 53. A filter element 56, hereinshown as of conical form, is embraced within the compartment 51 above the extension 53. Subject to direct recurring communication with this compartment 51 and its conical extension 53 are the series of tubes 41, 42 and 43, through the respective channels 57 and 58 and single axial channel 59, as these receptacles C move successively through the series of stations I, II, III, IV, V and VI, as will be explained in detail in the later "operation" section of this specification. Intermediate these groups of channels is a circumferential slot 62 and a port 54 communicating with a fresh-air duct through the axially extending fresh air duct 60. The slot 62 is of a length of about one-third the exterior circumference of the valve part and receives air-pressure from channel 160 separate from fresh-air duct 60. (See FIGS. 5, 9, 17 and 18)

It is important that note be taken here of the position and dimension of the slot 62 in the part 45 of the valve-complex 31. It is through this slot that fresh-air is supplied to any pair of the receptacles C when they are at the intermediate "food-cooking" stations III, IV and V, (FIGS. 11 and 13).

The lower compartment 52, closed by a plate 63 (FIG. 5), has communication with two axially-spaced, radial channels 54A and 65, the latter of which leads to a deteriorated air duct 66 wherein a pressure regulator is installed. The channel 54A is in registration with the tube 43 when a cooking receptacle is at Station II for the purpose of venting air pressure during the transfer of hot liquid from a receptacle at Station VI. The venting of pressure is done through the tube 43 from the receptacle through channel 54A, into the compartment 52 and out the deteriorated duct 66 incorporating a pressure regulator which is set to maintain a pressure somewhat lower than is set for the pressure cooking via slot 62 or special pressure duct 60 (FIGS. 5, 9 and 10). Such pressure regulator prevents the complete loss of pressure from the air-pressure receiver 102 during the transfer periods while the venting of the pressure via duct 66 prevents a static pressure between cooking receptacles at Stations VI and II during transfer which might otherwise retard the complete transfer of liquid and pressure from the receptacle at Station VI to Station II. During any transfer of hot liquid pressure is retained in both receptacles at Stations II and VI. This ensures that food products, cooked in this apparatus, are constantly under pressure from the inception of being immersed in hot liquid throughout the entire cooking period. A slightly higher pressure is maintained at Station VI to accelerate liquid transfer between Stations VI and II.

Note should be taken here that the air-duct 61 connects with the air-pressure reservoir receiver 102 independent of the air duct 160. The air which feeds the slot 62 via 160 supplies air-pressure for the cooking receptacles at Stations III, IV and V. Air outlet duct 66 (FIGS. 5 and 10 and 18) has the pressure regulator whereby pressure fed into the system by duct 61 is prevented from being dissipated to the extent of emptying the air-pressure receiver 102 and effecting the complete loss of pressure during the cooking process.

The rotatable outer frustum part 46 has ports 41', 42' and 43' wherewith are connected the hereinbefore-noted tubes 41, 42 and 43 for the respective receptacles C. Also, as shown in FIG. 5, a lower portion of this frustrum part integrates a gear 90, as will be explained in a following section of this specification.

It is important to note here the three series of circles 64' and 67' in FIG. 16. These represent the respective inner ends of the three elbows 68 fixed on the exterior of the rotatable outer frustrum part 46 of the valve-complex 31. Also, note should be taken here of the circle 54 in this FIG. 17. This is in the same circumference as the 43' ports and the slot 62 in the stationary valve part 45. As will be explained in the "operation" section of this specification, this port 54 provides for a charge of fresh air pressured into the receptacle C at the Station VI to accelerate the transfer of the hot liquid therefrom to the receptacle C at Station II.

Because of the weight of the receptacles C—particularly when loaded with cooking food—and their later-described critical functioning, these two parts 45 and 46 of the valve-complex 31, have to be very carefully formed and machined.

Heating of the receptacles C could be effected by gas units, as shown in copending application Ser. No. 750,353 filed Aug. 5, 1968, now U.S. Pat. No. 3,655,411, Apr. 11, 1972. However, for the instant development a type of heating element 71—presently preferred (FIG. 26)—is shown arranged in pairs in each of the receptacles C (FIG. 3). The terminal ends of each such heating element 71 extends outwardly of the respective receptacles C through insulation knobs 75 (FIG. 20). A pair of wires 76, from a junction box 77 fixed adjacent each receptacle C, provides for a 220 volt single-phase connection to the respective pairs of heating elements 71 for each receptacle C, during its cooking periods. Other wires from each junction box lead to the track-trolley feature 72.

The track-trolley feature 72 comprises a set of conduction bars 78, "*a*", "*b*" and "*c*", and pairs of opposed arms 79 each journaling a roller 81. A pair of such arms 79 are hingedly mounted on each receptacle C (FIGS. 22, 27). The mounting of these arms is such as will permit them to straddle the trackbars 78 so as to bring the rollers 81 into contact with the outer track bars "*a*" and "*c*", when the respective receptacles C are in the food-cooking positions III, IV and V, as indicated in FIG. 11.

These three conduction bars "*a*", "*b*" and "*c*" are insulatively attached to an arcuate-shaped plate 82 and protectively recessed in a channel-shaped, insulated hood 83 (FIGS. 21 and 22). The hood 83 is fixed interiorly on the framework B to embrace any two of the receptacles when in the Stations III, IV and V (FIGS. 3 and 11).

The linear dimension and positioning of the track-trolley feature 72—as shown in FIGS. 3 and 11—is such as will maintain heat for the pair of heating elements 71 in any receptacle C at the Stations III, IV and V.

Thermal couples 73 have suitable connections 73' to the respective pyrometer 74, FIG. 1. These pyrometers are instruments with a visual dial and manually-operable knob whereby to indicate the desired temperature of the hot-liquid in the receptacle C, as registered by the respective thermal couples 73. On the face of each pyrometer 74 is a small light bulb 74' which flashes "on" and "off" to indicate the condition of the respective heating element 74.

The motor-mechanism H-1, for effecting the sequential rotation of the receptacle C, is indicated most clearly in perspective in FIG. 18 and diagrammatically in FIG. 19. Such mechanism involves a motor 85 associated with a gear assembly 86 and an indexing component 87. A chain drive 88 to a pinion 89, meshing with a gear 90 on the valve-complex 31, effects the recurring sixty degree advance of the receptacles C through the hereinbefore noted six stations. (FIG. 11) All of these parts are more or less conventional structures. It is their arrangement and functioning that is significant, as determined by the presently described instruments I.

The motor 85 is a conventional ⅓ hp which, as shown in FIG. 18, is mounted on the framework B inwardly of the front of the cabinet A. The associated gear assembly 86 is a conventional arrangement such as will effect the requisite controlled advance of the receptacles C recurringly through the six stations as indicated, diagrammatically, in FIG. 11.

The indexing component 87 involes a clutch 91 and a tripswitch device 92. (FIGS. 18, 19 and 23) The relationship of this clutch 91 with the tripswitch 92 is indicated diagrammatically in FIG. 19. At the right of this figure a train of gears 86 is interposed between the gear assembly and the clutch 91 which, through the chain drive 88, effects the drive of the pinion 89 for advancing the receptacles C through the respective stations. The continued rotation of this gear assembly and the chain drive 88 is such that each complete rotation of the clutch 91 effects sixty degree advance of the receptacles C successively through the six stations, as shown in FIG. 11. The manner wherein this is effected will be set forth in the "operation" section of this specification.

The trip device 92 involves a rocker arm 93, mounting a roller 94, hinged to a housing 96 for activating a conventional microswitch concealed within the housing 96. As shown in FIG. 23 an action pin 97 for such microswitch, extends outwardly of the switch housing in contact with a hub 98 on the arm 93. Such a trip device 92 is arranged on the framework B so that the roller 94 is spring-biased for repeated contact with a trip stub 99 on the lower rim of the clutch 91.

The motor mechanism H-2, which provides for the requisite air-pressure in the receptacle C, is diagrammed in FIG. 3. This involves a conventional motor-compressor unit 101, air receiver unit 102 and a pressure-control item 103.

The motor-compressor unit 101 (FIG. 3) is a conventional assembly set in a foward part of the cabinet A on the supporting framework B. The air-pressure receiver 102 is set on a rear portion of the framework B, diagonally opposite the motor-compressor unit 101. The pressure-control item 103 is shown directly above the motor of the air-compressor unit 101. A tube 104 connects the two units 101 and 102. Another tube 105 leads from the air-receiver 102 to the fresh-air duct 61 (FIG. 5). Another tube 106 leads to fresh-air duct 160 which feeds slot 62 with constant air pressure. A pressure-relief valve is installed in the tube 105 to vent excess pressure to surge tank 126. This avoids excess pressure build-up during cooking at stations III, IV and V.

The Instruments I, for controlling the functioning of this apparatus are mounted on the panel J and have to do with controlling the successive food-cooking operation in the receptacles C. The arrangement of these instruments is shown in FIGS. 1 and 2.

Figure 2:
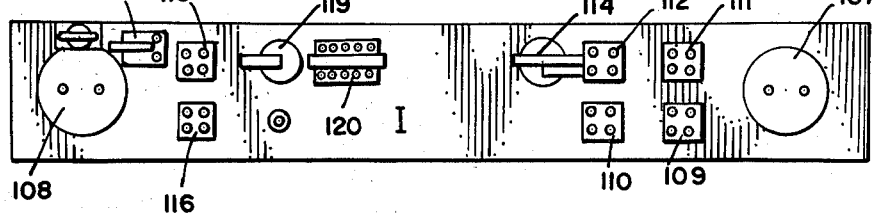
FIG. 2 is a rear view of the instrument panel shown in FIG. 1.

The two major instruments, of this group, are a cooking timer 107 and a hot-liquid transfer timer 108 (See FIG. 2). The respective manual-setting dials 107' and 108' for such timers are shown at opposite ends of the panel J in FIG. 1. From FIG. 2a it will be noted the dial 107' mounts two pointers. On the apparatus, one is black and the other is red. Adjacent the cooking timer 107 is a 220 volt switch 109 and a 110 volt switch 110 with control buttons 109' and 110' shown in FIG. 1. Corresponding signal lights 111 and 112 are positioned directly above these switch buttons 109' and 110'. Juxtaposed to these switches and lights is a rotatable indicator 113 for a cooking pressure-gage 114 shown on the back of this panel J (FIG. 2). Inwardly adjacent the dial 108' is a switch button and a signal light 117'. At the left of that is a fuse 121. The switch button 115 is in circuit with the holding relay 117 (FIG. 2) which factor in an assured, uninterrupted, sequential advance of the receptacles through the six stations, as shown in FIG. 11.

On the back of this panel are these other instruments, a holding relay 117, a safety relay-switch 118, a buzzer 119 and a junction board 120.

It is advantageous to have such a complement and arrangement of the instruments I to ensure not only the automatically-timed cooking periods for the receptacles containing the food but also to ensure against any hazard of an over-timed cooking period for any batch of food. This latter is achieved by the visual and audible signals 117' and 119 to alert an attendant to the need for unloading and loading each successive receptacle C at station I. These will be explained further in the "operation" section of the specification.

The auxiliary units L involve some form of supplemental filters 125, a surge tank 126, a receptacle draining-hose 127 and a receptacle flushing device 128 (FIG. 1).

The supplemental filters 125 (FIG. 28) serve as an accessory to the primary filter 56, to ensure the most complete straining of the hot liquid in the course of the transfer from one receptacle to another, as hereinbefore noted. When used these are removably set in the bottom of each receptacle. Obviously, these supplemental filters may be formed of various materials. This might depend upon the design and dimension of the receptacle wherein they are used. They could be disks of specially-formed, fairly stable porous substance such as generally will maintain its planar form when in use position. The type shown in FIG. 28 comprise upper and lower, fine-mesh fabric disks 131 and 132 with an interposed ring 133 interiorally spanned by a series of spokes 134. Whatever their structure such filters would be dimensioned just enough less than the interior diameter of the receptacles C as to seat in the bottom of a receptacle. They should be such as to easily be inserted into and withdrawn from the receptacles, as occasion may demand.

The surge-tank 126 as shown in FIG. 3 as of rectangular form and attached to the framework B at the lower, rear, right corner thereof. A pipe 136 is shown attached to the rear of the tank 126. This is for connection to a supplemental outlet exteriorly of the area to atmosphere wherein the apparatus normally is in use.

The draining hose 127 is shown in FIG. 27. It is provided for attachment to a drain-pipe 136 secured to the bottom of each of the receptacles C. Such a hose 127 is of a length sufficient to span the distance from the apparatus to a point that will permit the discard of the deteriorated liquid from the receptacle C to a sewage service. One end of such a hose 127 and the drain-pipe 136, have fixed to the respective parts a conventional "quick-connect and -release" coupling 137.

The receptacle flushing device 128 (FIG. 1) comprises a section of hose 138 embraced by a coiled spring 139 with a hand-controlled spray nozzle 140 at the other end. In this FIG. 1 the device is shown suspended from an overhead source of water supply in such disposition as to make it convenient for occasional use for cleansing the receptacles C from time to time, during and for after the use of the apparatus.

The food-containers 142 are in the nature of trays. As herein shown, they are of comparatively shallow depth and structured from a suitable type of perforate material. When stacks of such traylike containers 142 are inserted into the receptacles C the hot liquid floods all items of food in each tray. Each such tray has a short, integrated central nipple 144 and a plurality of prongs 145 depending from the bottom perimeter. These nipples 144 and prongs 145 are so arranged that when several loaded trays are stacked the prongs 145 on the upper tray engage the inner edge of the rim of the next lower tray with the central nipples 144 axially aligned (FIG. 30).

The handling tool 143 comprises a tube 146 embracing a rod 147 with respective handgrips 148 and 149, and a latch 150.

The hand-grip 148 is fixed to the upper end of a tube 146 and the hand-grip 149 is fixed to the upper end of a rod 147 concealed in the tube 146. The latch 150 is pivoted at 151 in the slotted lower end of the tube 146. A wire 152 connects the inner end of the latch 150 with the rod 147. The hand-grip 148 has an axial bore 153 wherein is housed a spring 154 retained in place by a nut 155 and bearing against a washer 156 fixed to the rod 147. The spring 154 normally biases the rod 147 to dispose the latch 150 radially outwardly at the lower end of the tube 146. However, when the two hand-grips 148 and 149 are grasped, so as to pull them toward each other, the spring 154 is compressed and the latch 150 is retracted into the tube 146. The use of this handling tool, with the food containers 142, will be explained in the "operation" section of the specification.

The method of operation requires recognition of the fact that the concept and construction thereof provides for a functioning never heretofore known or attainable in any antecedent disclosure. The functioning permits an uninterrupted, pressurized cooking of successive batches of food in hot, non-aqueous liquid in a plurality of receptacles wherein the hot liquid is injected for cooking food with an almost instant removal of the hot-liquid from each batch of cooked food and the immediate insertion of a fresh batch of food after a receptacle is drained of the hot-liquid and pressure.

Preparation for a continuing use of this apparatus requires recognition that such use may extend over several hours; sometimes for an entire day or night. To initiate that preparation, two receptacles (e.g. y and z FIG. 11) are supplied with the requisite amounts of the non-aqueous liquid. The amount for each receptacle may require a half to three-quarters of its capacity. When placed in these two receptacles the liquid may be at no more than room temperature—possible less. The supplying of these two receptacles with the liquid should take place with the two receptacles at the respective stations III and V (FIG. 11): The closure-lid 33 for each of these two receptacles then is set in place.

When any of these two receptacles C are at these stations III and V two pairs of rollers 81, of the track-trolley system 72, are in contact with the bars 78 "a" and "c" to supply a 220 volt to the heating elements 71 (FIGS. 3 and 24).

The button 109' is depressed. The signal light 111 is illuminated and the 220 volt current is supplied to the track-trolley system 72. The heating of the elements 71 in these two receptacles begins. The pyrometers 74 for all three receptacles C must be set to indicate the required cooking temperature in these two receptacles, and for any two receptacles thereafter at these two stations. Incidentally, when any two of the receptacles C has a port 43' of the tube 43 in registration with the peripheral slot 62, in the valve part 45 (See FIGS. 5, 17 and 18), air pressure in that one or those two receptacles is supplied and/or maintained therein. Such air pressure is derived from the air-pressure receiver 102 as it is developed and maintained by the air-compressor unit 101 (FIG. 3).

Any time the heating elements 71 are "on", in the respective receptacles at stations III, IV and V, the light 74' (FIG. 1) for the respective receptacles will indicate that fact.

These preliminaries having been effected the apparatus is ready for continuous use.

If it has not been done previously, the next operation is the setting of the dials 107' and 108' for the respective cooking-timer 107 and the hot-liquid transfer-timer 108. Obviously, this is effected by positioning the knobs on the dials 107' and 108'.

These timers and all of the other instruments on the panel J—other than the switch 109—are in a 110v circuit controlled by the activation of the button 110' and 115. However, there is a predetermined sequence that is imperative for the functioning of these instruments in the continuing operation of the apparatus, as will appear in what follows.

The liquid in the two receptacles, at stations III and V, being at the requisite temperature the next of these preparatory actions is the loading of the receptacle at station I. When this is done, and the closure-lid has been sealed in place, the buttons 110' and 115 are depressed. The lights 112 and 117' indicate that this 110v circuit has been closed to all the instruments involved for the continuous use of the apparatus.

The button 110', once so depressed, remains depressed during any continued use of the apparatus. The button 115, however, requires depressing, preferably, following each loading of a receptacle at station I. If this is not done, at that time, the buzzer 119 (FIG. 2) will sound to alert an attendant to such negligence. When there is this depression of the button 115, following the loading of any receptacle and the closure-lid 33 is set in position to seal the receptacle C at station I, the three receptacles, then, are advanced automatically one station each, in accordance with the pre-set time sequences controlled by the timers 107 and 108.

It is at this point that a hereinbefore-noted phenomenon of this invention takes place. . .viz: the recurring transfer of the hot-liquid from one receptacle to another at these stations. The nature of that transfer will become evident most readily by reference to FIG. 11. For example, the rotative part 46, of the valve-complex 31 (FIG. 5) being activated, advances receptacle z to station VI and receptacle x to station II. This brings the port 41', for the tube 41, and the port 43', for the tube 43 from the receptacle z, into registration with the respective channels 57 and 54 in the stationary part 45 of the valve-complex 31. Concurrently, the port 42' for the tube 42 and the port 43' for the tube 43 of the receptacle x are brought into registration with the respective channels 58 and 54A in the stationary valve part 45. This establishes three concurrent conditions in this valve-complex as this hot-liquid transfer between these two receptacles is effected. The hot liquid from the receptacle z drains from the tube 41 to the channel 57 which passes through the filter 56 and out through the channel 58 into the tube 42 for injection into the food-loaded receptacle x. Concurrently, fresh air from the duct 61 passes through the axial channel 60 via the radial port 54 into the tube 43 to the receptacle z; the fresh-air flow accelerates the flow of the hot-liquid through the filter 56 enroute to the receptacle x.

Here, then, two other phenomena of this invention are effected. One, is the injection of hot-liquid into the closure-sealed, food-loaded receptacle (e.g. receptacle x at station II). The other is the filtering of the hot-liquid incident to each hot-liquid transfer.

Although the receptacle z is emptied of hot liquid there is still pressure therein as the receptacle z moves from station VI to station I.

In its approach to station I, the port 43' for the just-drained receptacle z comes into registration with the inclined radial channel 59 FIGS. 5 and 14. Thereupon, all remaining pressure is vented from the receptacle z through the inclined channel 59 and into the lower extension 53 of the chamber 51. Such pressure passes through the bottom of the filter 56 and out through the chamber 51 into the channel 67 for discharge into the elbow 68, via port 67'. This vents the pressure through the port 64' at the bottom of the elbow 68 and out through the channel 64 into the stationary valve part 45 and through the deteriorated air duct 68A to the surge tank 126 (FIG. 3).

Such venting of this air flow through the filter 56 constitutes another of the phenomena of this apparatus; namely, the cleansing of the filter element 56 following the cooking of food in each of the receptacles.

In the instant embodiment the inclined channel 59 is below the filter compartment 51 and its extension 53. At the time of the aforementioned hot-liquid transfer, channel 59 is filled with a hot liquid, incident to the passing thereof from channel 57 down through chamber 51 and out through the filter 56 into the lower extension 53. Upon the next 60° rotation of the receptacles a tube 43 comes into registration with channel 59. Thereupon all remaining pressure in the receptacle, at station I, is vented through channel 59. This forces the hot liquid in the channel 59 up through the filter 56 and out through an elbow 68 and out through the duct 68A for discharge into the surge tank 126. Air pressure per se could be used to achieve this cleansing result.

The receptacle z, now practically drained of hot-liquid, and any remnant of air pressure, is set at station I as the receptacles x and y become set at station III and V, respectively. The closure lid 33 for the receptacle z at station I is removed, loaded with food and the closure lid reset within a few seconds. Meanwhile, the first-loaded receptacle x begins the food-cooking function at station III.

Figure 2A:
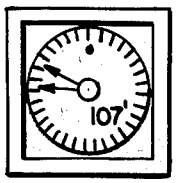
FIG. 2a is a much-enlarged view of the instrument shown at the left end of the instrument panel.

Note should be taken here of the earlier observation that there are two pointers associated with the cooking timer 107 (FIG. 2a). One is black, the other is red. When the knob for this cooking timer 107 is turned across the dial both pointers are set at the then-desired cooking period for each receptacle, successively at the two stations III and V. At the instant a food-loaded receptacle C moves into station III—and all the facilities are functioning—the red pointer initiates its move out from its set position toward zero on the dial. Upon reaching zero, the red pointer snaps back into registration with the black pointer. At that instant, providing that the switch 115 has been depressed, the holding switch 117 activates the clutch drive assembly 86 to rotate the receptacles 60° bringing the receptacles into stations II and VI respectively. At this station the transfer timer 108 takes control of the apparatus and retains the receptacles at stations II and VI until the red pointer on timer 108 reaches zero. The hot liquid transfer is completed and at the instant the red pointer of timer 108 reaches zero it snaps back to the pre-set black pointer. This activates the switch 117 to cause the clutch drive mechanism to advance the receptacles another 60° bringing the receptacles into stations I, III and V respectively. The timer 107, thereupon, resumes control of the apparatus in its continuous successive operation.

The button 110', when depressed, provides current for all the instruments functioning with a 110v current, (FIG. 2). This excepts only the trolley-track system 72.

The motor 85, for the mechanism H-1, is in constant operation with its functioning controlled by the "on-and-off" position of the clutch 91, as effected by the correlative functioning of the cooking timer 107 and the liquid-transfer timer 108.

As has been noted, in the antecedent portions of this "operation" section, the receptacles C move sequentially through recurring sixty degrees (FIG. 11). Such movement is controlled by the action of the clutch 91 and the switch-trip device 92 (FIG. 23), as permitted by the aforesaid action of the timers 107 and 108. Each depression of the button 115, preferably, immediately following the closure-lid sealing of the food-loaded receptacle C at station I, awaits the zeroing-out of the cooking-timer 107. When it occurs the result is a releasing of the holding switch 117. Thereupon, the circuit to the switch-trip device 92 reactivates the microswitch in the housing 96. This shifts the arm 93 to set the roller 94 in contact with the rim of the clutch 91 (FIG. 23). Under the action of the motor 85 the clutch 91 makes another revolution subject to the stub 99 contacting the roller 94. The arm 93 is retracted to cause the microswitch, in the housing 96, to cut off current and release the holding switch 117.

Upon the next movement of the red pointer, on the transfer timer 107, in the zero position, the microswitch in the housing 96 is reactivated to re-position the roller 93 against the rim of the clutch 91. The cooking-timer 107 is reactivated, causing the red pointer to move outward towards zero. At that instant the group of receptacles advance another sixty degrees.

The total cooking time for each loaded receptacle is determined by the time the receptacles are at stations III and V, plus any incidental time a receptacle is at station IV during the hot-liquid transfer between the receptacles at stations VI and II. For example, if the cooking timer 107 is set for three minutes and the transfer-timer 108 is set for one minute, the total cooking time for any food-loaded receptacle is seven minutes.

Periodically, these time periods will be influenced by the kind, quantity and quality of the food that is to be subjected to cooking.

FIG. 11 presents exemplary cooking periods of 180 sec., 30 sec., and 180 sec. for each receptacle C between each hot-liquid transfer. Therefore, the cooking timer might be set for 3 minutes of recurring cooking periods in each receptacle with the timer set at ½ minute.

As each receptacle moves into station I all remaining pressure is vented from it. Thereupon the attendant may instantly retract the closure-lid and remove the cooked food. He then may immediately load a batch of raw food into the empty receptacle and seal the closure-lid. The attendant then must depress button 115 which causes light 117 to be illuminated indicating that the apparatus is ready to automatically rotate another 60 degrees at the instant the red pointer on cooking timer 107 reaches zero. If the attendant fails to depress 115 the apparatus will not rotate at that instant but a buzzer will sound to warn the attendant that the apparatus is ready to rotate and he must depress the button 115 to allow it to do so. Failure to press the button 115 prevents the apparatus from moving into transfer stations II and IV, if an attendant has perhaps forgotten to unload, reload and seal the receptacle at station I.

The cooking of food in these receptacles is made expeditious and efficient by the use of the accessories illustrated in FIGS. 29, 30 and 31. It is believed their use is quite obvious from these several views and the explanation thereof in the foregoing part of this specification.

Note should be taken here that, when occasions may require, the apparatus may be used for cooking food in only one receptacle or in two receptacles. This is capable of being effected by the appropriate actuation of the instruments I, as explained above.

At the close of use of this apparatus—or at interims when long-extended operations are required—cleansing of the receptacles can be effected by use of either or both of the "flushing device" 128 and/or the "quick-connect" parts 137 (FIGS. 1 and 27) respectively. At any time when this is being done, the supplemental filters 125 (FIG. 28) could be removed and cleansed.

In the use of the valve-complex 31, as shown in FIG. 32, the outer part 46 is stationary and the inner part 45 is rotated. However, the sequences and results in effecting the cooking are substantially the same as above set forth.

In this FIG. 32, there are shown three receptacles similar in aspects to those described above except that they remain stationary and the inner part 45 of valve complex B1 is rotated in the timed relationship in the same sequence as above described. Although the receptacles are shown in vertical position, they could be placed in horizontal position with the same valve complex operating in a similar manner.

FIG. 33 discloses three receptacles in alignment with the receptacles being in horizontal position. The receptacles 170 are open ended and each is provided with a front closure 171 and a rear closure 172, each of which when in closing position, seal the receptacle. Forward supports 173 receive and hold the uncooked food from which it is inserted into the cooking receptacle. Rear supports 174 receive the cooked food from the receptacles. Each receptacle is sequentially used to receive the uncooked food, receive the hot non-aqueous liquid and pressure, cook the food, discharge the liquid and pressure, after which the cooked food is removed all in the timed relationship as described above. For descriptive purposes, the receptacles have been indicated $x'$, $y'$ and $z'$. The receptacle $x'$ is connected to receptacle $z'$ by a conduit 175 controlled by a valve 176, while $z'$ is connected to $y'$ by a conduit 177 controlled by a valve 178 and $y'$ is connected to $x'$ by a conduit 179 controlled by a valve 180.

The sequence of operation as shown is assuming $z'$ has completed a cooking operation and $y'$ has had uncooked food placed therein and the receptacle sealed the hot liquid and pressure is transferred from $z'$ to $y'$ through the controlled conduit 177. The cooked food is then removed from $z'$ through the rear opening after removing the closure 172. Then $y'$ begins a cooking operation while x' is being loaded with uncooked food and closed. Upon y' completing the cooking operation, the hot liquid and pressure is transferred to x' through the controlled conduit 179. During the cooking of the food in x', z' is loaded with uncooked food. After x' has completed the cooking period, the hot liquid and pressure is transferred to z' through the controlled conduit 175.

Although as diagrammatically shown in FIG. 33, the valves and conduits are separate, the valve complex 31 could be used in the operation of the receptacles as shown.

FIGS. 34–36, inclusive, disclose two receptacles both in the horizontal and vertical positions. The valved conduits, as shown, conduct the hot cooking liquid and pressure from one receptacle to the other as the cooking is completed in one receptacle and then back to the one receptacle as the cooking is completed in the other receptacle. A similar valve complex 31 could be used herein as modified for two receptacles.

Variations and modifications in the details of structure and arrangement of the parts may be resorted to within the spirit and coverage of the appended claims.

We claim:

1. The method of cooking food in hot, non-aqueous liquid under pressure, comprising the steps of: providing a plurality of pressurizable, sealable cooking receptacles each having an opening therein for the insertion and removal of food; interconnecting the plurality of receptacles via valve-controlled, fluid conducting conduits; placing cooking liquid in at least one but not all of said plurality of receptacles and closing and sealing said at least one receptacle and heating the liquid therein to a temperature sufficient to cook food; placing food to be cooked in another of said plurality of receptacles substantially free of cooking liquid therein; closing and sealing said another receptacle; pressurizing with mechanical means the liquid in said one receptacle to a pressure sufficient to substantially prevent vaporization of juices from the food at said temperature and transferring said liquid under said pressure from said at least one receptacle to said another receptacle; maintaining said pressure and temperature in said another receptacle for a predetermined time sufficient to cook the food therein; draining the cooking liquid from said another receptacle at the end of said predetermined time while maintaining said pressure therein; thereafter venting the pressure from said another receptacle; opening said another receptacle and removing the cooked food therefrom.

2. The method as set forth in claim 1, wherein the hot liquid is filtered as it is introduced into the said another receptacle.

3. The method as set forth in claim 1, wherein the cooking receptacle is cleaned after the hot liquid has passed therethrough.

4. The method as set forth in claim 1, wherein the receptacles are maintained in a vertical position with the opening at the top thereof.

5. The method as set forth in claim 1 wherein the receptacles are maintained in a horizontal position, and the receptacles have openings at each end thereof.

6. The method as set forth in claim 1, wherein the venting of the pressure in the cooking receptacle is controlled by a valve having a passage therein.

7. The method as set forth in claim 1, wherein the cooking receptacle is preheated before the insertion of the food therein.

8. The method as set forth in claim 1, wherein the transfer of the hot liquid and pressure, maintaining the pressure, removal of the hot liquid and release of the pressure is controlled by a valve having separate passages therein.

9. The method as set forth in claim 1, wherein the said source of pressure supplied to the cooking receptacle is pressurized air, and flowing said pressurized air into the receptacle at the end of a cooking period to reduce the temperature of the food.

10. The method as in claim 1, including the steps of opening said at least one receptacle after the transfer of liquid therefrom, inserting food to be cooked into said at least one receptacle, sealing said at least one receptacle, introducing heated and pressurized cooking liquid into said at least one receptacle and cooking the food therein.

11. The method as set forth in claim 1, wherein pressure in the cooking receptacle is regulated to a value below the pressure of the hot liquid during transfer of the hot liquid into the cooking receptacle, and thereafter the pressure in the cooking receptacle is elevated to a higher value.

12. The method as set forth in claim 1, wherein a filter is provided in association with each receptacle and the liquid is filtered as it is transferred from one receptacle to the next receptacle.

13. The method as set forth in claim 12, wherein the filter associated with each receptacle is flushed after withdrawal of the hot liquid from the other receptacle after the cooking of the food to cleanse the filter.

14. The method of cooking food in hot non-aqueous liquid under pressure, comprising the steps of:
 a. providing a plurality of cooking receptacles interconnected via valve-controlled conduit means and each having a sealable opening therein for the insertion and removal of food;
 b. providing at least one but not all of said plurality of receptacles with an amount of non-aqueous liquid under pressure and at a temperature sufficient to cook food;
 c. inserting food in another of said plurality of receptacles substantially free of cooking liquid;
 d. sealing the opening of the said another receptacle;
 e. pressurizing with air the liquid in said at least one receptacle to a pressure sufficient to substantially prevent vaporization of juices from the food at said temperature and transferring the hot liquid under said pressure via said conduit means from said at least one receptacle to said another receptacle and cooking the food therein;
 f. maintaining said pressure in said another receptacle during cooking;
 g. releasing the pressure in the one receptacle for unsealing the opening;
 h. inserting food in the one receptacle;
 i. sealing the opening of the one receptacle;
 j. introducing hot liquid under pressure sufficient to substantially prevent vaporization of juices from the food at said temperature in the one receptacle to cook the food therein;
 k. maintaining the pressure in the one receptacle during cooking of the food therein;
 l. removing the liquid from said another receptacle while maintaining the pressure therein; and
 m. releasing the pressure in said another receptacle and removing the seal and cooked food therefrom.

15. The method as set forth in claim 14, wherein the removal of the hot liquid from the one receptacle and introduction of the hot liquid into the cooking receptacle, the removal of the liquid from the cooking receptacle at the end of the cooking period and the releasing of the pressure in the cooking receptacle is controlled by a valve having separate passages therein.

16. The method as set forth in claim 14, wherein at least three receptacles are provided, supporting each receptacle on a single carrier, moving the receptacles through a series of stations where the food is placed in a receptacle and the receptacle sealed, forcing hot liquid under pressure into the receptacle, cooking the food, removing the hot liquid and releasing the pressure, and thereafter removing the cooked food, each receptacle being moved through the stations in timed sequence to carry out the various steps.

17. The method as set forth in claim 16, wherein the single carrier is rotated through the successive stations and a valve is provided on the carrier to sequentially control the steps set forth with a preset timer.

18. The method as set forth in claim 1, wherein a lower pressure is maintained in said another receptacle than in said one receptacle while the hot liquid is being introduced therein from said one receptacle.

19. The method as set forth in claim 14, wherein additional pressure is introduced into the cooking receptacle after the cooking of the food to aid in the removal of the hot liquid therefrom and to reduce the internal temperature of the receptacle.

20. The method of cooking food in hot, non-aqueous liquid under pressure comprising: providing a pressurizable cooking receptacle having an opening therein for the insertion and removal of food; inserting food into the receptacle; sealing the opening after inserting the food; providing a source of hot non-aqueous liquid at a temperature sufficient to cook food; pressurizing the liquid with air to a pressure to substantially prevent vaporization of juices from the food at said temperature; transferring the hot liquid under said pressure via valve controlled conduit means into the sealed receptacle in an amount sufficient to immerse the food therein, maintaining said pressure in the sealed receptacle during cooking, removing the liquid from the receptacle at the end of the cooking period while maintaining the pressure in the receptacle; releasing the pressure from the receptacle after the liquid is removed therefrom; and then unsealing the opening and removing the cooked food.

21. The method as set forth in claim 20, wherein the hot liquid is filtered as it is removed from the cooking receptacle.

22. The method as set forth in claim 21 wherein the filter is flushed after withdrawal of the liquid from the cooking receptacle to cleanse the filter.

23. The method as set forth in claim 20, wherein additional pressure is introduced from a separate source into the cooking receptacle after the sealing thereof.

24. The method as set forth in claim 20, wherein additional pressure is introduced from a separate source into the cooking receptacle concurrently with the introduction of the hot liquid.

25. The method as set forth in claim 20, wherein additional pressure is introduced into the cooking receptacle after the cooking of the food to aid in the removal of the hot liquid therefrom.

26. The method as set forth in claim 20, wherein at least three receptacles are provided and the receptacles are sequentially operated during a cycle whereby each receptacle in turn is operated to heat and store under pressure cooking liquid during one part of the cycle, and during another part of the cycle to cook the food, during controlled predetermined periods of time.

* * * * *